United States Patent
Agan et al.

(10) Patent No.: US 7,430,662 B2
(45) Date of Patent: Sep. 30, 2008

(54) TECHNIQUES FOR INITIALIZING A DEVICE ON AN EXPANSION CARD

(75) Inventors: Jing J. Agan, Houston, TX (US); Joseph W. Shifflett, Houston, TX (US); Kevin Depew, Kingwood, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/786,007

(22) Filed: Apr. 10, 2007

(65) Prior Publication Data

US 2007/0192582 A1 Aug. 16, 2007

Related U.S. Application Data

(62) Division of application No. 10/641,208, filed on Aug. 14, 2003, now Pat. No. 7,234,050.

(51) Int. Cl.
G06F 15/177 (2006.01)
(52) U.S. Cl. .................... 713/2; 713/1; 713/100
(58) Field of Classification Search ........ 713/2, 713/1, 100
See application file for complete search history.

(56) References Cited

U.S. PATENT DOCUMENTS

| | | | |
|---|---|---|---|
| 5,787,464 A * | 7/1998 | Yoshizawa et al. ........ 711/115 |
| 6,163,825 A | 12/2000 | Wallach et al. | |
| 6,170,028 B1 | 1/2001 | Wallach et al. | |
| 6,192,434 B1 | 2/2001 | Wallach et al. | |
| 6,401,198 B1 | 6/2002 | Harmer et al. | |
| 6,654,724 B1 | 11/2003 | Rubin et al. | |
| 6,664,969 B1 | 12/2003 | Emerson et al. | |
| 6,772,263 B1 | 8/2004 | Arramreddy | |
| 2003/0115349 A1 * | 6/2003 | Brinkman et al. ........ 709/231 |

* cited by examiner

Primary Examiner—Tse Chen

(57) ABSTRACT

Techniques for initializing/reinitializing a device on an expansion card without power cycling the system. More specifically, an instruction set is provided such that a device on an expansion card can be reinitialized without power cycling the system. Further, the instruction set may be implemented to initialize a device on a replacement expansion card. During the system boot, an expansion basic input/output system (BIOS) is copied into the system memory. After the system boot, a copy of the configuration information for the device on the expansion card is saved in a backup file in the system memory. The expansion card can be removed and replaced and the configuration information stored in the backup file in the system memory can be used to configure the replacement device. The copy of the expansion BIOS in the system memory can be reprogrammed such that it can be implemented to initialize the device on the replacement expansion card without power cycling the system.

20 Claims, 4 Drawing Sheets

TECHNIQUES FOR INITIALIZING A DEVICE ON AN EXPANSION CARD

CROSS-REFERENCE TO RELATED APPLICATIONS

This application is a Divisional of U.S. application Ser. No. 10/641,208, filed Aug. 14, 2003 now U.S. Pat. No. 7,234,050.

BACKGROUND

This section is intended to introduce the reader to various aspects of art, which may be related to various embodiments of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer systems generally include hardware resources, including but not limited to one or more central processing units, such as microprocessors, and one or more memory devices, such as random access memory (RAM) devices, which make up the system memory. An operating system provides the software that manages the hardware and software resources of the computer system, including the microprocessor and system memory. The operating system generally provides a user interface such that the resources may be accessed and controlled by a user.

When a computer is initially powered on, the system memory is empty. To configure the computer system to facilitate the use of its resources, the operating system is loaded into the system memory. The process of launching the operating system is generally referred to as the "system boot." Once the boot process is complete and the operating system is loaded into the system memory, the operating system may be implemented to control and manage both hardware and software resources. However, before the system boot, the system memory cannot be implemented to execute commands because the operating system has not been loaded into system memory. To provide boot instructions for loading the operating system, a basic input/output system (BIOS) is generally provided. The system BIOS is typically stored in a read only memory (ROM) chip or a flash memory chip in the computer system. The BIOS provides instructions necessary to load the operating system and to implement other initialization and testing functions during the system boot.

Because each computer system may include different hardware components, the BIOS software is also configured to perform a power-on self-test (POST) to test the functionality of the different hardware components on the computer system. The POST generally refers to a diagnostic testing sequence executed by the BIOS software to determine whether the random access memory (RAM), peripheral devices, such as disk drives, and any other hardware components are operating properly. Further, a number of devices may be coupled to the computer system through expansion slots. Devices such as expansion memory, network devices, video and audio chips, etc., may be included on expansion cards which are configured to be coupled to the computer system through the expansion slots. Each of the expansion cards may include an expansion ROM that includes BIOS software for devices on the expansion card. At system boot, the system BIOS configures the computer system in accordance with the current resources, including any expansion cards that may be coupled into the computer system. Accordingly, the system BIOS also facilitates the activation of the additional BIOS that may be included on the expansion cards.

As can be appreciated, the more complex the system configuration and the more resources included in the system, the longer the booting of the computer system may take. In many instances, booting the computer system may take several minutes. In certain applications, this timing penalty may be disadvantageous.

Once the boot process is complete and the operating system is up and running, expansion boards or cards may be added or removed from the computer system. "Hot swapping" or "hot plugging" generally refers to replacing components in a computer system while the system is powered on. If an expansion board is replaced after the system boot sequence, the computer system is generally rebooted such that it can be reconfigured to include the components on the replacement expansion card. As can be appreciated, initiating a power cycle to reboot the system generally incurs the time penalty, since the system is being completely rebooted, thereby mitigating some of the advantages of hot-swapping.

SUMMARY OF THE INVENTION

In accordance with one embodiment of the present invention, there is provided a method comprising: copying an expansion basic input/output system (BIOS) from an expansion card to a system memory to provide a shadowed expansion BIOS, wherein the expansion card is electrically coupled to a computer system through an expansion slot, and wherein the expansion BIOS comprises instructions for initializing an expansion device on the expansion card; storing a backup configuration file in the system memory, wherein the backup configuration file comprises configuration information for the expansion device; power cycling the expansion slot; copying the backup configuration file from the system memory to a configuration space on the expansion device; and initializing the expansion device on the expansion card without power cycling the computer system.

In accordance with another embodiment of the present invention, there is provided a method comprising: copying an expansion basic input/output system (BIOS) from a first expansion card to a system memory to provide a shadowed expansion BIOS, wherein the first expansion card is electrically coupled to a computer system through an expansion slot, and wherein the expansion BIOS comprises instructions for initializing a first expansion device on the first expansion card; storing a backup configuration file in the system memory, wherein the backup configuration file comprises configuration information for the first expansion device; powering down the expansion slot; removing the first expansion card from the expansion slot; inserting a second expansion card into the expansion slot while the computer system is powered up, wherein the second expansion card comprises the same type of expansion card as the first expansion card, and wherein the second expansion card comprises a second expansion device; powering up the expansion slot; copying the backup configuration file from the system memory to a configuration space on the second expansion device; and initializing the second expansion device on the second expansion card without power cycling the computer system.

In accordance with yet another embodiment of the present invention, there is provided a method comprising: booting a computer system, wherein the computer system comprises a system memory, an expansion bus, an expansion slot, and a first expansion board coupled to the expansion slot, wherein the first expansion board comprises a first expansion device having a first device type; copying an instruction set for initializing the first device type from the first expansion board to an area of the system memory; creating a backup configuration file in the system memory, wherein the backup configuration file corresponds to the first expansion device; powering off the expansion slot without powering off the computer system; replacing the first expansion board with a second expansion board comprising a second expansion device having the first device type; powering on the expansion slot; copying the backup configuration file from the system memory to a configuration space in the second expansion device; reprogramming the instruction set in the system memory; and executing the instruction set in the system memory to initialize the second expansion device.

In accordance with still another embodiment of the present invention, there is provided a method comprising: booting a computer system, wherein the computer system comprises a system memory, a peripheral component interconnect (PCI) bus, a peripheral component interconnect (PCI) slot, and a first Remote Insight Board coupled to the PCI slot, wherein the first Remote Insight Board comprises a first ATI Rage XL video controller and an ATI Rage XL video basic input/output system (BIOS); copying the ATI Rage XL video BIOS from an ATI Rage XL video read only memory (ROM) device on the first Remote Insight Board to the system memory at address C000:0000; creating a backup configuration file in the system memory, wherein the backup configuration file corresponds to the first ATI Rage XL video controller; powering off the PCI slot without powering off the computer system; replacing the first Remote Insight Board with a second Remote Insight Board, wherein the second Remote Insight Board comprises a second ATI Rage XL video controller; powering on the PCI slot; copying the backup configuration file from the system memory to a configuration space in the second ATI Rage XL video controller; reprogramming the shadowed ATI Rage XL video BIOS in the system memory; and executing the shadowed ATI Rage XL video BIOS to initialize the second ATI Rage XL video controller on the second Remote Insight Board.

In accordance with a further embodiment of the present invention, there is provided a computer-readable medium storing computer instructions for: booting a computer system, wherein the computer system comprises a system memory, an expansion bus, an expansion slot, and a first expansion board coupled to the expansion slot, wherein the first expansion board comprises a first expansion device having a first device type; copying an instruction set for initializing the first device type from the first expansion board to an area of the system memory; creating a backup configuration file in the system memory, wherein the backup configuration file corresponds to the first expansion device on the first expansion board; powering off the expansion slot without powering off the computer system; replacing the first expansion board with a second expansion board comprising a second expansion device having the first device type; powering on the expansion slot; copying the backup configuration file from the system memory to a configuration space in the second expansion device; reprogramming the instruction set in the system memory; and executing the instruction set in the system memory to initialize the second expansion device.

In accordance with still a further embodiment of the present invention, there is provided a computer-readable medium storing computer instructions for: booting a computer system, wherein the computer system comprises a system memory, a peripheral component interconnect (PCI) bus, a peripheral component interconnect (PCI) slot, and a first Remote Insight Board coupled to the PCI slot, wherein the first Remote Insight Board comprises a first ATI Rage XL video controller and an ATI Rage XL video basic input/output system (BIOS); copying the ATI Rage XL video BIOS from an ATI Rage XL video read only memory (ROM) device on the first Remote Insight Board to the system memory at address C000:0000; creating a backup configuration file in the system memory, wherein the backup configuration file corresponds to the first ATI Rage XL video controller; powering off the PCI slot without powering off the computer system; replacing the first Remote Insight Board with a second Remote Insight Board, wherein the second Remote Insight Board comprises a second ATI Rage XL video controller; powering on the PCI slot; copying the backup configuration file from the system memory to a configuration space in the second ATI Rage XL video controller; reprogramming the shadowed ATI Rage XL video BIOS in the system memory; and executing the shadowed ATI Rage XL video BIOS to initialize the second ATI Rage XL video controller on the second Remote Insight Board.

In accordance with another embodiment of the present invention, there is provided a computer system comprising: a processor; a system memory coupled to the processor; a system basic input/output system (BIOS) coupled to the processor and the system memory; an expansion BIOS configured to initialize an expansion device when an expansion card comprising the expansion device has been coupled to the processor and system memory through an expansion slot, wherein the expansion BIOS is not configured to initialize the expansion device unless the computer system is power cycled; and an instruction set configured to initialize the option video controller without power cycling the computer system.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
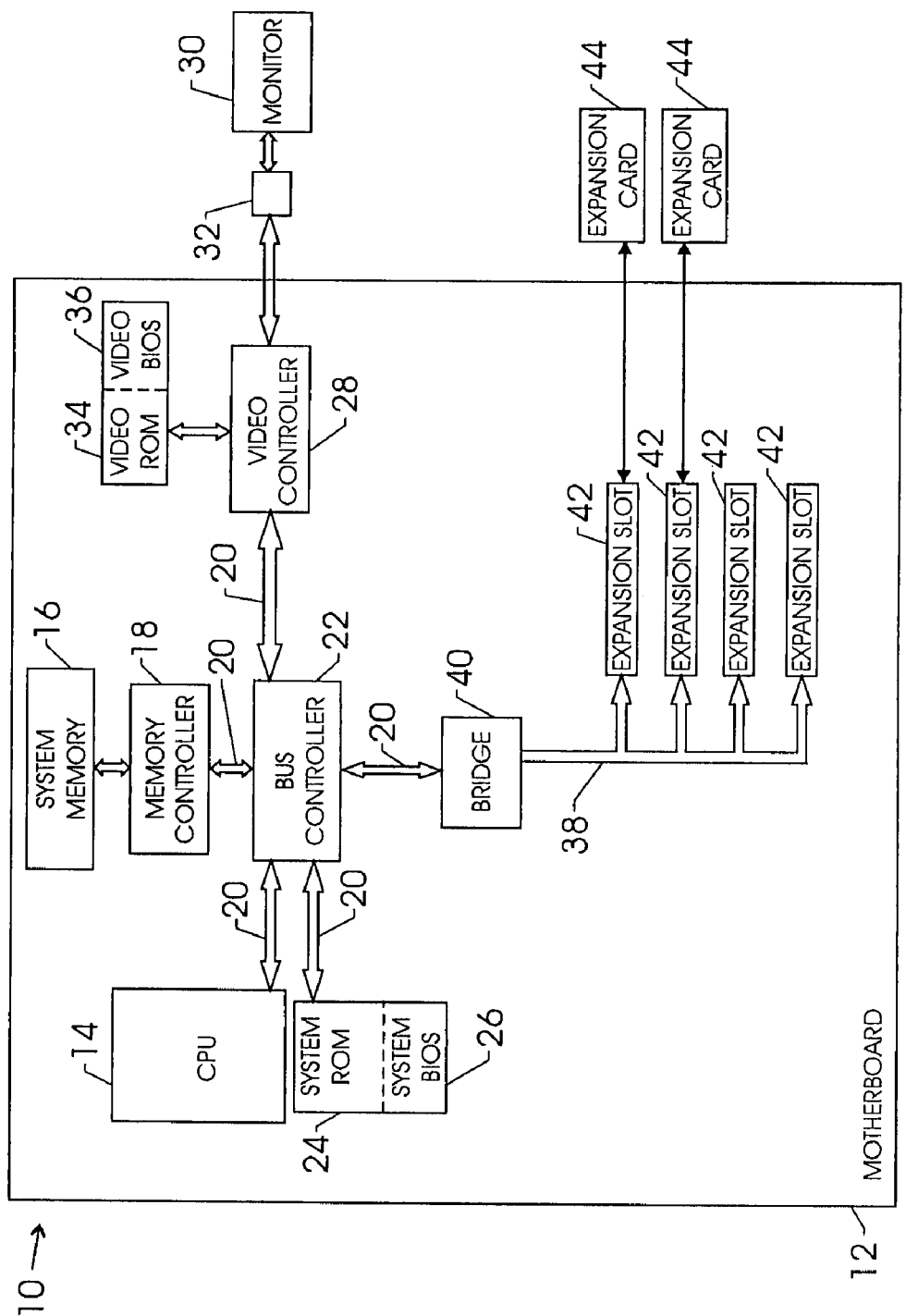
FIG. 1 is a block diagram of a computer system in accordance with exemplary embodiments of the present invention.

FIG. 1 illustrates a block diagram of an exemplary computer system 10. The system 10 includes a system motherboard 12. Generally speaking, the motherboard 12 includes processors, memory devices, controllers, bridges, and other hardware components. The motherboard 12 may also include a number of ports to facilitate the connection of peripheral devices, such as a monitor, a keyboard, a mouse, disk drives and speakers, for instance. The motherboard 12 may also include a number of expansion slots or connectors which are configured to facilitate the connection of additional system boards and expansion cards.

In the present exemplary embodiment, the motherboard 12 includes a central processing unit (CPU) 14, such as a microprocessor. The CPU 14 may include one or more microprocessors, such as Pentium, Pentium Pro, Pentium II, Pentium III or Xeon microprocessors available from Intel Corporation. As can be appreciated, the number and type of microprocessors may vary depending on the system.

The system 10 also includes system memory 16. The system memory 16 generally includes a number of random access memory (RAM) devices, such as dynamic random access devices (DRAMs) and/or static random access devices (SRAMs). A memory controller 18 may be implemented to provide an interface between the system memory 16 and other components of the system 10. The amount and type of memory devices that populate the system memory 16 may vary depending on the system.

The CPU 14 may be coupled to the system memory 16 and the memory controller 18 through a system bus 20. As can be appreciated, the system bus 20 generally connects the CPU 14 to the system memory 16 and further connects each of the additional components of the computer system 10 to the CPU 14 and the system memory 16. To coordinate the exchange of information on the system bus 20, a bus controller 22 may be provided. The bus controller 22 is generally configured to maintain and manage data transfer along the system bus 20 and among the various components of the computer system 10.

In addition to the memory system 16, the motherboard 12 generally includes a system read only memory (ROM) 24. The system ROM 24 includes one or more non-volatile memory chips which are used to permanently store instruction code and system data. The system ROM 24 generally includes a basic input/output system (BIOS) 26. The system BIOS 26 generally includes the instruction sets implemented in loading the operating system, testing the availability, functionality, and presence of system components at power up, and activating system components in accordance with the specific configuration that is detected.

Although different BIOS designs perform essentially the same steps in a slightly different order, at some point, the system BIOS 26 reads the configuration registers within the hardware devices to determine what devices exist on the system, and what the resource requirements are for those devices. After reading the configuration registers in the devices, the system BIOS 26 allocates the system resources to configure a maximum number of devices. The system BIOS 26 also determines from the device registers which drivers to load into the system memory 16 to allow the CPU 14 to access the device. The system BIOS 26 is also implemented to activate other BIOS that may be implemented in the computer system 10, as discussed further below.

The motherboard 12 may also include a video controller 28. The video controller 28 is generally implemented to convert digital video information generated by the CPU 14 into a signal for driving a display, such as a monitor 30. The monitor 30 is generally coupled to the video controller 28 through a port 32 on the backside of the computer system 10. The motherboard 12 may also include a video ROM 34 configured to store permanent information relating specifically to the video controller 28. For instance, the video ROM 34 may include a video BIOS 36 which includes code for controlling the video controller 28. During boot, the system BIOS 26 activates the video BIOS 36 to configure the video controller 28 and the system memory 16. As can be appreciated, a video controller 28 may be integrated into the system 10, as a video chip on the motherboard 12, as described above. Further, the video controller 28 may be integrated into the system as an expansion video card through a bus, such as an industry standard architecture (ISA) bus, a peripheral component interconnect (PCI) bus, a video electronics standards association (VESA) local bus (VLB), or an accelerated graphics port (AGP). AGP is considered as an expansion bus as well.

To add more devices to the computer system 10, one or more expansion buses 38 may be provided. Because the expansion bus 38 may be configured to operate at a different speed and width than the system bus 20, a bridge 40 may be provided to facilitate the exchange of information from devices on the expansion bus 38 to the CPU 14 and system memory 16. The present exemplary embodiment illustrates a single expansion bus 38 and a single bridge 40. However, as can be appreciated, a number of expansion buses 38 and corresponding bridges 40 may be provided. Further, the bridge 40 and bus controller 22 may be integrated in a single chip configured to perform bridging and control functions.

In the present exemplary embodiment, the expansion bus 38 comprises a peripheral component interconnect (PCI) bus which generally has a width of 32 bits or 64 bits and an operating frequency of 33 MHz to 66 MHz. Further, the expansion bus 38 may comprise a PCI-X bus for providing data transfer rates of 133 MHz, for instance. Alternatively, the expansion bus 38 may comprise an industry standard architecture (ISA) bus to facilitate the addition of boards and devices configured in accordance with ISA standards. An ISA bus is generally configured to transfer data at 8 MHz and has a 16 bit data path. Still further, the expansion bus 38 may comprise a video electronics standards association (VESA) local bus (VLB), an enhanced industry standard architecture (EISA) bus or a micro channel architecture (MCA) bus, having widths of 32-bits, for instance. As can be appreciated, one or more expansion buses 38 comprising any desirable bus architecture may be included in the system 10.

As previously described, the expansion bus 38 may be implemented to add additional components to the computer system 10. Accordingly, the motherboard 12 may include a number of expansion slots 42, such as connectors, configured to receive expansion cards 44. The present exemplary motherboard 12 includes four expansion slots 42 to facilitate the addition of up to four expansion cards 44. As described further below, each expansion card 44 may include a number of devices configured to provide additional capabilities to the computer system 10.

As can be appreciated, the expansion buses 38 may be configured as an accelerated graphics port (AGP) which only has one AGP expansion slot 42 specifically designed to receive an AGP video card. An AGP channel is generally 32 bits wide and runs at 66 MHz, yielding a total bandwidth of 266 MBps. AGP may also include additional modes which support bandwidths of 533 MBps and 1.07 GBps. In systems wherein an expansion bus 38 comprises an AGP, an AGP video expansion card 44 may be coupled to the AGP expansion slot 42 which is designated for the AGP video card.

Figure 2:
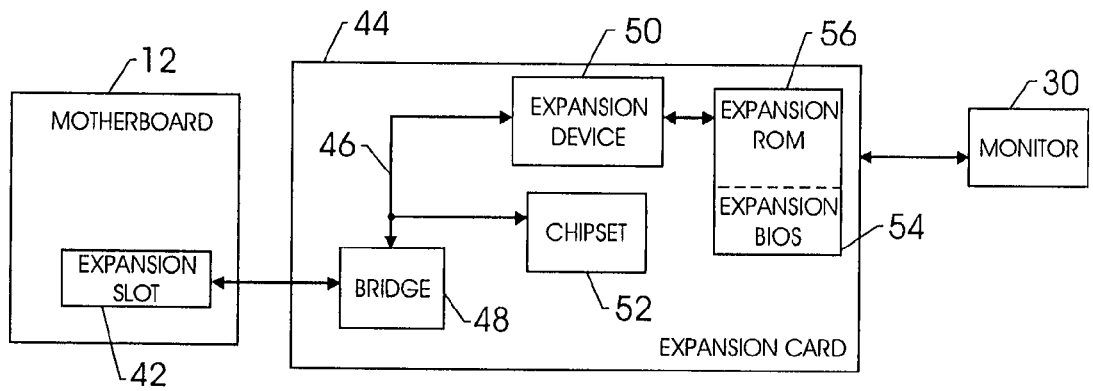
FIG. 2 is a block diagram of an expansion card in accordance with exemplary embodiments of the present invention.

Referring to FIG. 2, a block diagram of an exemplary expansion card 44 is illustrated. The expansion card 44 includes an edge connector which is configured to be inserted into an expansion slot 42 on the motherboard 12. The expansion bus 38 (FIG. 1) is electrically coupled to the local bus 46 on the expansion card 44 through the expansion slot 42. The expansion card 44 may include a bridge 48 to facilitate the exchange of information between the expansion bus 38 and the local bus 46 on the expansion card 44. The expansion card 44 may include an expansion device 50, such as an option video controller. The expansion card 44 also includes a chipset 52 which comprises a number of devices that may be implemented on the expansion card 44 depending on the particular functions of the expansion card 44.

As previously described, and described further below, during system boot, the system BIOS 26 (FIG. 1) determines what devices, including those devices available on the expansion cards 44, are coupled to the system, configures the devices, configures memory for the operating system, initializes the hardware devices and tests the devices. The testing of the various hardware components in the computer system 10 may be referred to generally as a power-on self-test (POST). During the POST routine, any additional BIOS is activated by the system BIOS 26. For instance, during the POST sequence, the video BIOS 36 (FIG. 1) is generally copied into the system memory 16 and the initialization portion of the video BIOS 36 is executed to initialize the video controller 28.

In the present exemplary embodiment, the system 10 also includes an expansion card 44 coupled to the expansion slot 42. The exemplary expansion card 44 includes an expansion device 50, such as an option video controller, and an associated expansion BIOS 54, such as option video BIOS which is stored on an expansion ROM 56, such as an option video ROM 56. Accordingly, during the POST sequence, the system BIOS 26 also activates the expansion BIOS 54 to initialize the expansion device 50 on the expansion card 44. Because the exemplary embodiment comprises an option video BIOS and an option video controller, the system monitor is coupled directly to a video connector on the expansion card 44. As can be appreciated, the option video controller and option video BIOS on the expansion card 44 are configured to replace the functionality of the video controller 28 and video BIOS 36 on the motherboard 12. Accordingly, once the expansion card 44 is powered up, control of the monitor 30 is provided through the option video controller (i.e., the expansion device 50), rather than the video controller 28.

As previously described, the devices on the expansion card 44 are generally initialized and activated during the system boot. In some applications, it may also be advantageous to initialize the devices on the expansion card 44 without power cycling the entire computer system, thereby avoiding the time penalty associated with repeating the system boot sequence. For instance, during a hot-swap or hot-plug operation, an expansion board 44 may be replaced in the expansion slot 42 after the system 10 has already booted. Rather than powering down the computer system to reinitiate the boot sequence through the system BIOS 26, it may be desirable to simply initialize the devices on the expansion card 44, such as the expansion device 50, while the system 10 is powered up.

During manufacture of an expansion card 44, it is often desirable to test the devices on the expansion card 44 for functionality within a system 10. Accordingly, multiple expansion cards 44 may be inserted into and removed from an expansion slot 42 during diagnostic/functional testing. Any reduction in the amount of time it takes to test each expansion card 44 advantageously increases the number of expansion cards 44 that may be tested and manufactured over a period of time. By reducing or eliminating the time penalty associated with rebooting the computer system 10 to reinitialize the devices on the expansion card 44 during diagnostic testing and manufacturing may be advantageous. However, because expansion cards 44 having a respective expansion BIOS 54 are generally initialized during the boot process, they are generally not configured to be reinitialized without booting the system 10. In accordance with embodiments of the present invention, the devices on the expansion card 44, such as the expansion device 50, may be initialized/reinitialized without reinitiating a system boot, as will be described further with respect to FIG. 4, below.

Figure 3:
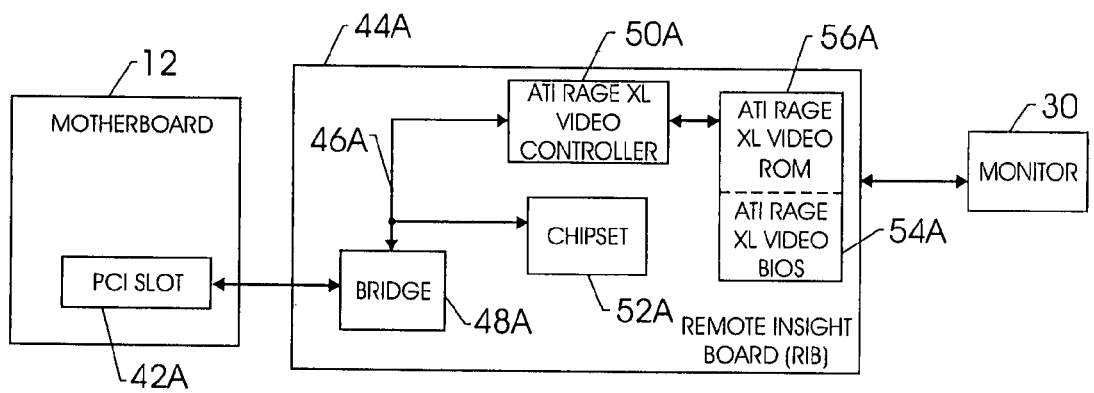
FIGS. 3 is a block diagram of an exemplary remote insight board in, accordance with exemplary embodiments of the present invention.

FIG. 3 illustrates a more specific embodiment of an expansion card 44, described with reference to FIG. 2, that may be implemented in accordance with embodiments of the present invention. The expansion card may comprise a Remote Insight board (RIB) 44A available through Hewlett-Packard, for example. The RIB 44A is generally configured to provide remote management for a networked, server based computer system. The RIB 44A generally includes a microprocessor, memory, battery, keyboard port and video controller to provide complete hardware independence from the motherboard 12. Relevant to the present techniques, the RIB 44A includes an expansion video controller and an expansion video ROM. More specifically, the RIB 44A includes an ATI Rage XL video controller 50A and an ATI Rage XL video ROM 56A. The ATI Rage XL video ROM 56A includes an ATI Rage XL video BIOS 54A. The RIB 44A also includes a chipset 52A that may include additional processors, memory, network interface controller, keyboard/mouse port, battery and devices that are configured to implement various functions. The ATI Rage XL video controller 50A and ATI Rage XL video BIOS 54A on the RIB 44A are configured to replace the functionality of the video controller 28 and video BIOS 36 on the motherboard 12. Accordingly, once the RIB 44A is powered up, control of the monitor 30 is provided through the ATI Rage XL video controller 50A.

One embodiment of the present technique of initializing or reinitializing a device on an expansion card, such as a video controller, will now be described with reference to FIG. 4. Though the present exemplary flow chart illustrated in FIG. 4 describes reinitializing a video controller on an expansion card, the present techniques may be applicable to reinitializing various other types of devices on other expansion cards, such that initialization of the devices can take place without cold booting (i.e., without power-cycling) the computer system 10. Further, the present techniques may be applicable to various types of expansion buses. FIG. 5 illustrates a more specific embodiment of the present technique, describing the reinitialization of a specific video controller on a remote server management expansion card, such as the Remote Insight Board having an ATI Rage XL video controller.

The instruction set for implementing the techniques may be included in a program, such as a DOS program, that may be downloaded into the system memory 26 from a floppy disk, for instance. Alternatively, the instruction set may be stored in the chipset on the expansion card 44. Regardless of where the instruction set originates, once the instruction set is stored in the system memory 26, the instruction set may be configured such that it can be initiated by a user through a DOS command line, a function key, a switch, or a button for instance. As will be evident through the discussion below, the instruction set generally includes command sequences to: 1) save the configuration space of the expansion device 50 on the expansion card 44 into the system memory 16; 2) power cycle the expansion slot 42; 3) restore the configuration space of the expansion device 50 on the expansion card 44 from the system memory 16; and 4) initialize/reinitialize the expansion device 50.

Figure 4:
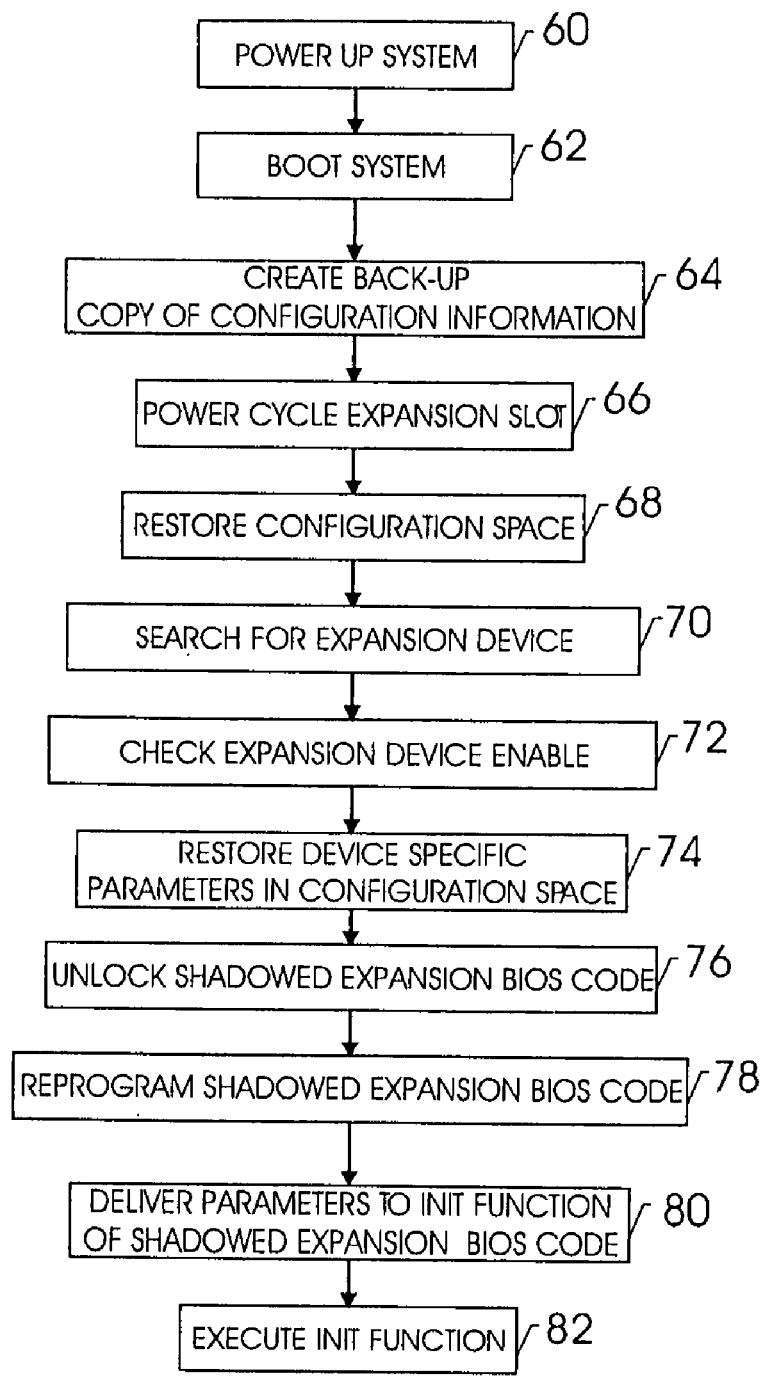
FIGS. 4 is a flow chart illustrating an instruction set in accordance with exemplary embodiments of the present invention.
Figure 5:
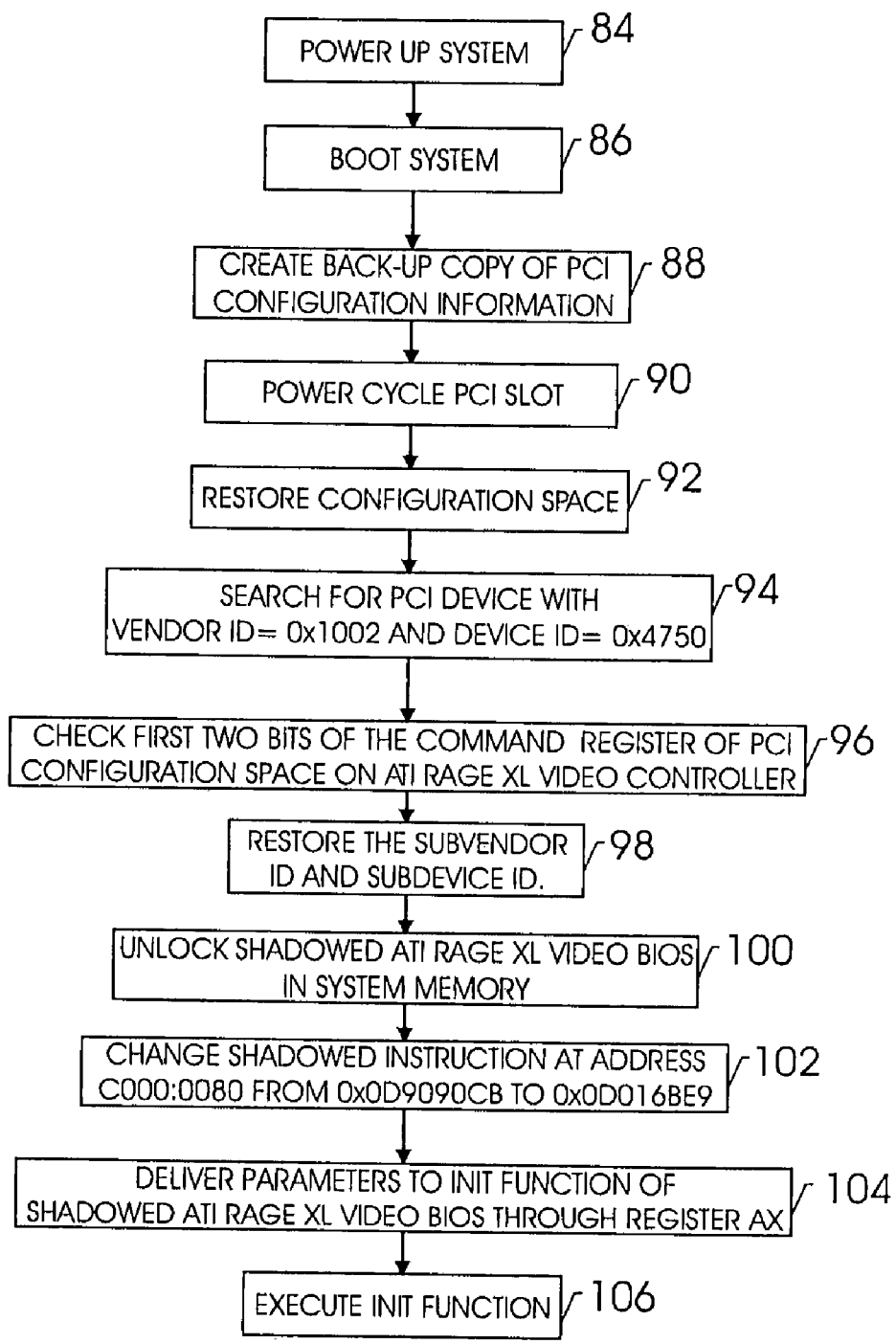
FIGS. 5 is a is a flow chart illustrating an instruction set for an exemplary remote insight board in accordance with exemplary embodiments of the present invention.

Referring initially to FIG. 4, the computer system 10 is powered up, as indicated by block 60. Initially, the system memory 16 is empty and therefore has nothing to execute. The CPU 14 is configured to access the system BIOS 26 in the system ROM 24 at power up. The system BIOS 26 initiates the boot sequence such that the system 10 can be implemented. Execution of the boot sequence is generally indicated by block 62. As can be appreciated, the system BIOS 26 may be copied into the system memory 16 before execution, since the code may be accessed and executed more quickly from the system memory 16 than from the slower system ROM 24. The specific details of the boot sequence may vary depending on the configuration of the system 10, including the particular peripheral devices and expansion cards that are connected to system 10. Accordingly, certain aspects of the present description of the boot sequence may or may not be implemented in all systems. Further, the description of the boot sequence is not intended to be a complete description of the boot sequence, but rather a description including details relevant to the present disclosure.

At the beginning of the boot sequence, the system BIOS 26 performs the Power-On Self-Test (POST). The POST is a diagnostic program that checks the system hardware to ensure that everything is present and functioning properly and generally configures the system 10 in accordance with the particular devices present in the system 10. During the POST, the system BIOS 26 accesses the video ROM 34 and executes the video BIOS 36 to initialize the video controller 28 and configure the system memory 26 for storage of video information. If there are additional BIOS programs in the system 10, the system BIOS 26 initiates the additional BIOS programs.

Generally speaking, each device, such as the expansion device 50 having the expansion ROM 56, has a memory or register space reserved for device configuration. As can be appreciated, the configuration space or register space is an addressable memory space reserved on a device that is accessed by configuration cycles initiated by the CPU 14. For PCI devices, for instance, there are 256 bytes of addressable PCI configuration space. As can be appreciated, industry standard PCI configuration space includes a PCI configuration header in the first 65 bytes of the configuration space. The configuration header may include a number of industry standard registers such as the Base Address Registers, the Interrupt Line Register and the Command register. Additional configuration information, such as Vendor id, Device id, Sub Vendor id, Sub Device id, Class Code, Status Register, Interrupt Pin, Header Type and Revision id may also be stored in the configuration space, for instance. During configuration of the expansion device 50 at system boot, the expansion BIOS 54 fills portions of the configuration space with the designated information, as can be appreciated by those skilled in the art.

If an expansion card 44 includes an option video controller, the video controller 28 on the motherboard 12 is disabled by the expansion BIOS 54 (here an option video BIOS) such that control of the monitor 30 is implemented through the option video controller. Once the system BIOS 26 detects an expansion BIOS 54, control is temporarily given to the expansion BIOS 54, such that the option video BIOS (expansion video BIOS 54) can be implemented to initialize the video system, including the option video controller (i.e., expansion device 50).

The option video BIOS (expansion BIOS 54) generally includes two sections of code: an initialization code section ("INIT") for initializing the option video controller (expansion device 50) during the system boot; and a runtime code section ("Interrupt 10") which is implemented while the computer system 10 is powered up and running (i.e., after the system boot). Once control is given to the option video BIOS during the boot sequence, the initialization portion (INIT) of the code is executed to initialize the option video controller. The initialization portion (INIT) of option video BIOS is not configured to be accessed again, once the system boot is complete. Accordingly, after the boot sequence, the option video controller is not configured to be reinitialized without initiating another boot sequence.

Generally, the entire option video BIOS (expansion BIOS 54) code is copied from the option video ROM (expansion ROM 56) and stored in the system memory 16 before it is executed. Copying the executable code from an expansion ROM 56 is generally referred to as "shadowing." By shadowing the option video BIOS code into system memory 16, the option video BIOS code can be accessed and executed much faster in the system memory 16 (containing RAM) than in the slower option video ROM. As used herein, the shadowed expansion BIOS or code refers to the copy of the BIOS code that is stored in the system memory 16. Once the expansion BIOS code is copied into the system memory 16 and after the initialization portion (INIT) of the code is executed, the INIT code may be discarded or abbreviated such that portions of the system memory 16 can be released, allowing more efficient use of the system memory 16. After discarding or abbreviating the INIT code, the remaining shadowed expansion BIOS code is "locked" or write-protected such that it cannot be overwritten or modified at runtime.

As previously described, once detected by the system BIOS 26, the expansion BIOS 54 may be mapped (i.e., copied) in the system memory 16. The particular mapping of the expansion BIOS 54 into the system memory 16 during the system boot may vary depending on the system 10. In one exemplary embodiment of the system 10, the expansion BIOS 54 may be mapped into location C000:0000 of the system memory 16. The INIT portion of the expansion BIOS 54 is generally mapped to memory location C000:0003 and the Interrupt 10 portion of the expansion BIOS 54 may be mapped to C000:0064. Accordingly, during the boot sequence, the system BIOS 26 is directed to the initialization portion (INIT) of the expansion BIOS 54 in the system memory 16 such that the INIT code can be executed and the expansion device 50 can be initialized and portions of the device configuration space can be written. After the expansion device 50 is initialized, control is returned to the system BIOS 26 such that the boot sequence can be completed.

If the system 10 is configured to receive hot pluggable expansion boards, it may be desirable to replace the expansion card 44 while the system 10 is powered up and initialize the newly inserted expansion device 50. Further, in certain instances, it may be advantageous to reinitialize the expansion device 50 after the boot process is complete. As can be appreciated, to implement the features of a newly inserted hot-pluggable expansion card 44, the expansion device 50 on the expansion card 44 may be initialized and the system 10 may be reconfigured to accommodate the features. If a user is testing the functionality of a number of expansion cards 44 by incrementally inserting the expansion cards 44 into the system 10, it may be advantageous to minimize the initialization time for the expansion device 50, such that more expansion boards 44 may be tested over a given period of time.

To initialize a new expansion device 50 that has been hot plugged into the system 10, or to reinitialize the current expansion device 50 at some time after the initial system boot, a user could power cycle the system 10 to re-execute the boot sequence, such that the system BIOS 26 can initiate the new expansion BIOS 54 to initialize the expansion device 50. However, as previously described, the boot sequence may take several minutes to complete. It may be advantageous if the expansion device 50 could be initialized without power-cycling the entire system 10. Techniques for initializing the expansion device 50 without power cycling the system 10 are described below.

As can be appreciated, to initialize the expansion device 50, the configuration space in the device should contain accurate and current system information. In accordance with embodiments of the present invention, after the system boot is complete, the configuration information for a device 50 is copied from the configuration space in the expansion device 50 to an available space in the system memory 16 to create a back-up configuration file, as indicated in block 64. Next, the expansion slot 42 containing the expansion card 44 is power cycled (i.e., powered down and then powered up), as indicated by block 66. The power cycling of the expansion slot 42 may be performed through the expansion bus 38, which may be a PCI bus, an ISA bus, an EISA bus, an MCA bus, a VESA local bus or an Accelerated Graphics Port, for example, as previously discussed. Alternatively, the expansion slot 42 may be power cycled through a command on an inter-IC bus (I2C) that may also be coupled to the expansion slot 42, as can be appreciated by those skilled in the art.

During the power cycle, and while the expansion slot 42 is powered down, the expansion card 44 may be replaced with another expansion card 44, before the expansion slot 42 is powered on again. The replacement expansion card 44 is a hot-plug card since it can be inserted into the system 10 while the system 10 is powered-up. Accordingly, in one exemplary embodiment, the power cycle sequence (block 66 of FIG. 4) may include: 1) powering off the expansion slot 42; 2) replacing the expansion card 44; and 3) powering up the expansion slot 42. As can be appreciated, the replacement expansion card 44 will not include some of the configuration information since it was not present during the system boot and initialization. That is to say that once the expansion slot 42 is powered on with the replacement expansion card 44 inserted into the expansion slot 42, the configuration space in the replacement expansion device 50 will not include the proper configuration information. Accordingly, the configuration space in the replacement expansion device 50 may be "restored" after the power cycle, as indicated in block 68. To restore the configuration space in the replacement expansion device 50, the backup configuration file may be copied from the system memory 16 to the replacement expansion device 50.

While the above description includes replacing the expansion card 44, it may be desirable to power cycle the expansion slot 42 without replacing the expansion card 44. That is to say that the expansion slot 42 may be powered down and powered up without removing the original expansion card 44. In this exemplary embodiment, it may still be desirable to "restore" (i.e., rewrite) the configuration space on the expansion device 50 (block 68) using the back-up file stored in the system memory 16 (block 64). Accordingly, regardless of whether the expansion card 44 is replaced, the initialization/reinitialization of the expansion device 50 may include the steps described in blocks 66 and 68, as can be appreciated by those skilled in the art.

After restoring the configuration space on the expansion device 50, a search is performed to locate and identify the expansion device 50 on the expansion card 44, as indicated by block 70 of FIG. 4. Generally speaking, the search portion of the routine may search for an identification element that is unique to the expansion device 50. For instance, if the expansion device 50 comprises a PCI or an AGP video controller, the search instructions may comprise a function call, such as a PCI BIOS call, configured to search for the particular vendor id and device id corresponding to the particular type of expansion device 50 that is being implemented on the expansion card 44 (here a PCI or an AGP video controller). If the search is successful, the function call may return a number of device parameters correlating to the expansion device 50. For instance, the search may be configured to return the bus number, device number and function number corresponding to the option video controller 50. These parameters may be combined to form an address to uniquely identify the location and device of the option video controller 50 such that it can be reinitialized. As can be appreciated, for different types of expansion cards 44, such as ISA or VESA local bus expansion cards, for example, the search operation may implement different search parameters.

Next, the command register (or other register) of the expansion device 50 may be checked to ensure that the expansion device 50 is enabled, as indicated in block 72. If the expansion device 50 is enabled, it is active and functional. As can be appreciated, a number of video controllers may be present in the system 10. If the expansion device 50 is an option video controller, and the option video controller is enabled, the system 10 is implementing that particular video controller. If the expansion device 50 is enabled, additional write operations may be implemented to insure that all of the device-specific parameters in the configuration space on the device 50 are restored accurately, as indicated by block 74.

After the configuration space is completely restored, the location in system memory 16 containing the shadowed expansion BIOS 54 (i.e., the copy of the expansion BIOS 54) is "unlocked" such that it is writeable, as indicated in block 76. As previously described, during the boot sequence, once the expansion BIOS 54 is copied into the system memory 16 and after the initialization code (INIT) is executed, the area of system memory 16 containing the shadowed expansion BIOS 54 is generally "locked" or write-protected, such that the shadowed expansion BIOS 54 cannot be overwritten or modified. By making the location in system memory 16 containing the shadowed expansion BIOS 54 writeable, the standard functionality of the expansion BIOS 54 can be modified, without implementing a design change in the hard code stored in the expansion ROM 56. As can be appreciated, it may be advantageous to provide a way to modify the shadowed expansion BIOS 54 without implementing a design change to the expansion ROM 56.

As previously discussed, once the expansion BIOS 54 is copied into the system memory 26 and initiated during the POST, the code may be configured such that the initialization function (INIT) cannot be re-executed. To facilitate the re-initialization of the expansion device 50 in accordance with embodiments of the present techniques, a portion of the shadowed expansion BIOS 54 stored in the system memory 16 is reprogrammed such that the INIT segment of the shadowed expansion BIOS 54 can be executed again, as indicated in block 78. As can be appreciated, the portion of the shadowed expansion BIOS 54 stored in the system memory 16 that is reprogrammed will vary depending on the particular devices and code implemented in the system 10. An exemplary embodiment of the reprogramming step will be described more specifically with reference to FIG. 5 below.

After reprogramming the shadowed expansion BIOS 54, the parameters that were returned during the search (block 70), such as the bus number, device number and function number corresponding to the expansion device 50 comprising a PCI device or an AGP device, for instance, may be delivered to the initialization function (INIT) of the shadowed expansion BIOS 54 since the INIT code may implement these parameters during execution, as indicated in block 80. Finally, the INIT function may be executed, as indicated in block 82. Executing the INIT function will reinitialize the expansion device 50 on the expansion card 44. If the expansion card 44 was replaced during the power cycling of the expansion slot 42, the new expansion device 50, having the same device type as the prior expansion device 50, will be initialized.

After initialization/reinitialization of the expansion device 50, it may be advantageous to return the shadowed copy of the expansion BIOS 54 to its original state (i.e., before reprogramming). In one exemplary embodiment, the shadowed expansion video BIOS 54 is configured to automatically return to an original state (i.e., before the reprogramming) before each execution of the initialization code. In another exemplary embodiment, the instruction set implemented to reinitialize the expansion device 50 without power-cycling the system 10 may also include instructions for returning the shadowed expansion BIOS 54 stored in the system memory 16 to their original state. That is to say that shadowed expansion BIOS 54 may be reprogrammed again such that the initialization portion (INIT) of the code is not executed again, unless the presently described instruction set reinitializing the expansion device 50 without rebooting the system 10 is executed again.

FIG. 5 illustrates a more specific exemplary embodiment of the present invention wherein the expansion bus 38 comprises a PCI bus and the expansion card 44 comprises a Remote Insight Board (RIB) 44A. That is to say, the present embodiment described below with reference to FIG. 5 is a more specific implementation of the technique described with reference to FIG. 4. Accordingly, the following description should be supplemented with the details provided in the discussion above.

As previously described, the system 10 is powered up, as indicated in block 84. After applying power to the system 10, the boot sequence begins, as indicated in block 86. During the POST, the system BIOS 26 determines what devices are present in the system 10 and configures the system memory 26 accordingly. In the present exemplary embodiment, the system BIOS 26 will detect the RIB 44A in the PCI slot 42A and devices on the RIB 44A, such as the ATI Rage XL video controller 50A. The system BIOS 26 copies the ATI Rage XL BIOS code 54A from the ATI Rage XL option ROM 56A to the system memory 26. The BIOS code 54A is copied into the system memory 26 at memory location C000:0000. For the ATI Rage XL BIOS code 54A, the first two bytes ("offset 0" and "offset 1") include the ATI Rage XL BIOS code signature, AA55h. Offset 2 includes information indicating the size of the ATI Rage XL BIOS code 54A. The initialization portion of the code (INIT) is copied into address location C000:0003 (offset 3), and the run-time portion of the code (Interrupt 10) is copied to address location C000:0064, for example. As previously described, the system monitor 30 is coupled directly to a video connector on the RIB 44A when the system 10 is powered-on. Thus, the video controller 28 on the motherboard 12 is disabled and the ATI Rage XL video controller 50A on the RIB 44A is enabled such that video control is conducted through the RIB 44A once the boot process is complete and the system 10 is fully operational.

After the system boot is complete, a backup configuration file for the devices on the system 10, including the ATI Rage XL video controller 50A, is created and stored in the system memory 16, as indicated in block 88. Next, the PCI slot 42A containing RIB 44A is power cycled, as indicated by block 90. The power cycling of the PCI slot 42A may be performed through the PCI bus, an ISA bus, an EISA bus, an MCA bus, a VESA local bus or an inter-IC bus (I2C), for example. After the PCI slot 42A is power cycled (including the replacement of the RIB 44A, as previously described in one exemplary embodiment), the configuration space on the ATI Rage XL video controller 50A (and any other PCI devices) is restored using the backup configuration file, as indicated in block 92.

Next, a PCI BIOS search function is called to locate the ATI Rage XL video controller 50A on the RIB 44A. Specifically, a search for a PCI device matching the vendor id of 0x1002 and device id of 0x4752 may be implemented to locate the ATI Rage XL video controller 50A, as indicated in block 94. As can be appreciated, these ids are unique to the ATI Rage XL video controller 50A. If the search is successful, the bus number, device number and function number of the ATI Rage XL video controller 50A on the RIB 44A are returned.

Next, information in the command register in the PCI configuration space for the ATI Rage XL video controller 50A is retrieved, using a PCI BIOS READ WORD function, for instance. As can be appreciated, the bus number, device number and function number are parameters implemented in this function call. If the function call is successful, the 16 bits of data stored in the command register are returned. Then, the first two bits of the command register (starting from the least significant bit) of the ATI Rage XL video controller 50A are checked (if one of the first two bits is 1) to ensure that the ATI Rage XL video controller 50A is enabled, as indicated in block 96. In the present exemplary embodiment, the offset 0x2c to offset 0x2f in the configuration space for the ATI Rage XL video controller 50A is read only. This area of the configuration space contains the subvendor id and the subdevice id. As can be appreciated, by writing to offsets 0x4c to 0x4f (during the restoration of the configuration space, as indicated in block 92), the 0x2c to 0x2f offsets are overwritten. These offsets should be restored with the proper subvendor id and subdevice id, as indicated in block 98. Typically, the offsets 0x4c to 0x4f contain zeros. When the PCI configuration information is restored using the backup configuration information, registers at offsets 0x2c to 0x2f are overwritten with zeros. By rewriting the correct subvendor id and subdevice id to the offset 0x4c to 0x4f, the offset 0x2c to 0x2f will be restored correctly, as can be appreciated by those skilled in the art. In the present exemplary embodiment, by rewriting the correct subvendor id (here, 0x0E11) and subdevice id (here, 0x001E) to offsets 0x4c to 0x4f, the correct subvendor id and subdevice id for the ATI Rage XL video controller 50A are restored in offsets 0x2c to 0x2f.

After the configuration space of the ATI Rage XL video controller 50A is properly restored, the location in system memory 16 containing the shadowed ATI Rage XL video BIOS 54A is "unlocked" such that it is writeable, as indicated in block 100. To facilitate the re-initialization of the ATI Rage XL video controller 50A in accordance with embodiments of the present techniques, a portion of the shadowed ATI Rage XL video BIOS 54A stored in the system memory 16 is reprogrammed such that the initialization portion (INIT) of the shadowed code can be executed again, as indicated in block 102. Specifically, the "Retf" command in the shadowed ATI Rage XL video BIOS 54A stored at memory address C000:0080 in the present exemplary embodiment is replaced with a "JMP Init_ROM" command. More specifically, the instruction code for the Retf command (0x0D9090CB) is changed to the instruction code for the JMP Init_ROM command (0x0D016BE9).

After reprogramming the shadowed ATI Rage XL video BIOS code 54A (in the system memory 16), the PCI bus number, device number and function number corresponding to the ATI Rage XL video controller 50A, may be delivered to register AX for implementation by the initialization function (INIT) of the shadowed ATI Rage XL video BIOS code 54A such that the parameters may be used to issue a PCI BIOS call to find the PCI configuration information needed to execute the INIT function, as indicated in block 104. Finally, the INIT function may be executed, as indicated in block 106, by making a far call to address location C000:0003. Executing the INIT function will reinitialize the ATI Rage XL video controller 50A on the RIB 44A. If the RIB 44A was replaced during the power cycling of the PCI slot 42A, the new ATI Rage XL video controller 50A will be initialized. If the RIB 44A is not replaced during the power cycling, the same ATI Rage XL video controller 50A will be reinitialized.

As previously described, after initialization/reinitialization of the ATI Rage XL video controller 50A, it may be advantageous to return the shadowed copy of the ATI Rage XL video BIOS 54A to its original state (i.e., before reprogramming). In one exemplary embodiment, the shadowed ATI Rage XL video BIOS 54A is configured to automatically return to an original state (i.e., before reprogramming) before each execution of the initialization code. In another exemplary embodiment, the instruction set implemented to reinitialize the ATI Rage XL video controller 50A without power-cycling the system 10 may also include instructions for returning the shadowed ATI Rage XL video BIOS 54A stored in the system memory 16 to its original state. That is to say that the shadowed ATI Rage XL video BIOS 54A may be reprogrammed again such that the initialization portion (INIT) of the code is not executed again, unless the presently described instruction set reinitializing the ATI Rage XL video controller 50A without rebooting the system 10 is executed again. Specifically, the JMP Init_ROM command in the shadowed ATI Rage XL video BIOS 54A stored at address location C000:0080 in the system memory 16 is replaced with the Retf function. More specifically, the instruction code for the JMP Init_ROM command (0x0D016BE9) is changed back to the instruction code for the Retf command (0x0D9090CB).

The above-described base functions comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising: copying an expansion basic input/output system (BIOS) from a first expansion card to a system memory to provide a shadowed expansion BIOS, wherein the first expansion card is electrically coupled to a computer system through an expansion slot, and wherein the expansion BIOS comprises instructions for initializing a first expansion device on the first expansion card; storing a backup configuration file in the system memory, wherein the backup configuration file comprises configuration information for the first expansion device; powering down the expansion slot; removing the first expansion card from the expansion slot; inserting a second expansion card into the expansion slot while the computer system is powered up, wherein the second expansion card comprises a same type of expansion card as the first expansion card, and wherein the second expansion card comprises a second expansion device; powering up the expansion slot; copying the backup configuration file from the system memory to a second configuration space on the second expansion device; and initializing the second expansion device on the second expansion card without power cycling the computer system.

2. The method, as set forth in claim 1, wherein copying the expansion BIOS from the first expansion card to the system memory, comprises copying an option video BIOS, wherein the option video BIOS comprises instructions for initializing a video controller on the first expansion card.

3. The method, as set forth in claim 1, comprising storing the configuration information for the first expansion device in a first configuration space on the first expansion device during a system boot, and wherein storing the backup configuration file comprises copying the configuration information for the first expansion device from the first configuration space on the first expansion device to the system memory.

4. The method, as set forth in claim 1, wherein powering down the expansion slot comprises powering down the expansion slot through a peripheral component interconnect (PCI) bus while the computer system remains powered on.

5. The method, as set forth in claim 1, wherein initializing the second expansion device on the second expansion card comprises:
   unlocking the shadowed expansion BIOS stored in the system memory;
   reprogramming the shadowed expansion BIOS; and
   executing an initialization portion of the shadowed expansion BIOS.

6. The method, as set forth in claim 1, wherein the method is performed in the recited order.

7. A method comprising:
   booting a computer system, wherein the computer system comprises a system memory, an expansion bus, an expansion slot, and a first expansion board coupled to the expansion slot, wherein the first expansion board comprises a first expansion device having a first device type;
   copying an instruction set for initializing the first device type from the first expansion board to an area of the system memory;
   creating a backup configuration file in the system memory, wherein the backup configuration file corresponds to the first expansion device on the first expansion board;

powering off the expansion slot without powering off the computer system;
replacing the first expansion board with a second expansion board comprising a second expansion device having the first device type;
powering on the expansion slot;
copying the backup configuration file from the system memory to a configuration space in the second expansion device;
reprogramming the instruction set in the system memory;
executing the instruction set in the system memory to initialize the second expansion device; and
deprogramming the instruction set in the system memory after executing the instruction set, such that the instruction set cannot be re-executed.

8. The method, as set forth in claim 7, comprising, after copying the backup configuration file from the system memory to the configuration space in the second expansion device: searching for the second expansion device having the first device type; determining whether the second expansion device is enabled; and restoring any device-specific parameters in the second expansion device.

9. The method, as set forth in claim 7, comprising unlocking the area in the system memory containing the instruction set such that the area of system memory containing the instruction set is writeable.

10. The method, as set forth in claim 7, wherein the method is performed in the recited order.

11. A method comprising:
booting a computer system, wherein the computer system comprises a system memory, a peripheral component interconnect (PCI) bus, a peripheral component interconnect (PCI) slot, and a first Remote Insight Board coupled to the PCI slot, wherein the first Remote Insight Board comprises a first ATI Rage XL video controller and an ATI Rage XL video basic input/output system (BIOS);
copying the ATI Rage XL video BIOS from an ATI Rage XL video read only memory (ROM) device on the first Remote Insight Board to the system memory at address C000:0000 to provide a shadowed ATI Rage XL video BIOS;
creating a backup configuration file in the system memory, wherein the backup configuration file corresponds to the first ATI Rage XL video controller;
powering off the PCI slot without powering off the computer system;
replacing the first Remote Insight Board with a second Remote Insight Board, wherein the second Remote Insight Board comprises a second ATI Rage XL video controller;
powering on the PCI slot;
copying the backup configuration file from the system memory to a configuration space in the second ATI Rage XL video controller;
reprogramming the shadowed ATI Rage XL video BIOS in the system memory; and
executing the shadowed ATI Rage XL video BIOS in the system memory to initialize the second ATI Rage XL video controller on the second Remote Insight Board.

12. The method, as set forth in claim 11, wherein powering off the PCI slot comprises powering off the PCI slot through the PCI bus.

13. The method, as set forth in claim 11, comprising, after powering on the PCI slot: searching for the second ATI Rage XL video controller; determining whether the second ATI Rage XL video controller on the second Remote Insight Board is enabled; and copying a subvendor identification and a subdevice identification corresponding to the second ATI Rage XL video controller to the configuration space in the second ATI Rage XL video controller at offsets 0x4c to 0x4f.

14. The method, as set forth in claim 11, comprising unlocking the system memory at address C000:0000 containing the shadowed ATI Rage XL video BIOS such that the system memory at address C000:0000 containing the shadowed ATI Rage XL video BIOS is writeable.

15. The method, as set forth in claim 11, wherein reprogramming the shadowed ATI Rage XL video BIOS comprises changing an instruction at address C000:0080 in the system memory from a Retf command to a JMP Init_ROM command.

16. The method, as set forth in claim 15, wherein changing the instruction at address C000:0080 in the system memory from the Retf command to the JMP $Init_{13}$ ROM command comprises changing the instruction from 0x0D9090 CB to 0x0D016BE9.

17. The method, as set forth in claim 11, comprising deprogramming the shadowed ATI Rage XL video BIOS in the system memory after executing the shadowed ATI Rage XL video BIOS to initialize the second ATI Rage XL video controller, such that deprogramming comprises changing an instruction at address C000:0080 in the system memory from a JMP Init_ROM command to a Retf command.

18. The method, as set forth in claim 11, wherein the method is performed in the recited order.

19. A tangible computer-readable medium storing computer instructions thereon for execution by a processor to perform a method comprising:
booting a computer system, wherein the computer system comprises a system memory, an expansion bus, an expansion slot, and a first expansion board coupled to the expansion slot, wherein the first expansion board comprises a first expansion device having a first device type;
copying an instruction set for initializing the first device type from the first expansion board to an area of the system memory;
creating a backup configuration file in the system memory, wherein the backup configuration file corresponds to the first expansion device on the first expansion board;
powering off the expansion slot without powering off the computer system;
replacing the first expansion board with a second expansion board comprising a second expansion device having the first device type;
powering on the expansion slot;
copying the backup configuration file from the system memory to a configuration space in the second expansion device;
reprogramming the instruction set in the system memory;
executing the instruction set in the system memory to initialize the second expansion device; and
deprogramming the instruction set in the system memory after executing the instruction set, such that the instruction set cannot be re-executed.

20. A tangible computer-readable medium storing computer instructions thereon for execution by a processor to perform a method comprising: booting a computer system, wherein the computer system comprises a system memory, a peripheral component interconnect (PCI) bus, a peripheral component interconnect (PCI) slot, and a first Remote Insight Board coupled to the PCI slot, wherein the first Remote Insight Board comprises a first ATI Rage XL video controller and an ATI Rage XL video basic input/output system (BIOS);

copying the ATI Rage XL video BIOS from an ATI Rage XL video read only memory (ROM) device on the first Remote Insight Board to the system memory at address C000:0000; creating a backup configuration file in the system memory, wherein the backup configuration file corresponds to the first ATI Rage XL video controller; powering off the PCI slot without powering off the computer system; replacing the first Remote Insight Board with a second Remote Insight Board, wherein the second Remote Insight Board comprises a second ATI Rage XL video controller; powering on the PCI slot; copying the backup configuration file from the system memory to a configuration space in the second ATI Rage XL video controller; reprogramming a shadowed ATI Rage XL video BIOS in the system memory; and executing the shadowed ATI Rage XL video BIOS in the system memory to initialize the second ATI Rage XL video controller on the second Remote Insight Board.

* * * * *

UNITED STATES PATENT AND TRADEMARK OFFICE
CERTIFICATE OF CORRECTION

PATENT NO.       : 7,430,662 B2
APPLICATION NO.  : 11/786007
DATED            : September 30, 2008
INVENTOR(S)      : Jing J. Agan et al.

Page 1 of 1

It is certified that error appears in the above-identified patent and that said Letters Patent is hereby corrected as shown below:

In column 18, line 17, in Claim 16, delete "$Init_{13}$ ROM" and insert -- Init_ROM --, therefor.

Signed and Sealed this

Twenty-eighth Day of July, 2009

JOHN DOLL
*Acting Director of the United States Patent and Trademark Office*